United States Patent
Lin

(10) Patent No.: US 11,232,210 B2
(45) Date of Patent: Jan. 25, 2022

(54) SECURE FIRMWARE BOOTING

(71) Applicant: Western Digital Technologies, Inc., San Jose, CA (US)

(72) Inventor: Tino Lin, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 269 days.

(21) Appl. No.: 16/365,346

(22) Filed: Mar. 26, 2019

(65) Prior Publication Data

US 2020/0311278 A1    Oct. 1, 2020

(51) Int. Cl.
*G06F 21/57* (2013.01)
*H04L 9/06* (2006.01)

(52) U.S. Cl.
CPC .......... *G06F 21/572* (2013.01); *G06F 21/575* (2013.01); *H04L 9/0631* (2013.01); *H04L 9/0643* (2013.01)

(58) Field of Classification Search
None
See application file for complete search history.

(56) References Cited

U.S. PATENT DOCUMENTS

| | | |
|---|---|---|
| 7,055,148 B2 | 5/2006 | Marsh et al. |
| 7,089,547 B2 | 8/2006 | Goodman et al. |
| 7,330,982 B1 | 2/2008 | Mehr |
| 7,752,676 B2 | 7/2010 | Hartung et al. |
| 7,849,514 B2 | 12/2010 | Usov et al. |
| 8,300,831 B2 | 10/2012 | Kahler et al. |
| 8,353,053 B1 | 1/2013 | Chebiyyam |
| 8,494,170 B2 | 7/2013 | Kahler et al. |
| 8,522,322 B2 | 8/2013 | Wishman et al. |
| 8,560,823 B1 | 10/2013 | Aytek et al. |
| 8,661,259 B2 | 2/2014 | Yocom-Piatt et al. |
| 8,812,854 B2 | 8/2014 | Shah et al. |
| 9,256,744 B2 | 2/2016 | Hsu |
| 9,734,339 B2 | 8/2017 | Jeansonne et al. |
| 9,792,439 B2 | 10/2017 | Colnot |
| 9,853,811 B1 | 12/2017 | Levy et al. |

(Continued)

FOREIGN PATENT DOCUMENTS

| | | |
|---|---|---|
| CN | 10463668 A | 2/2015 |
| WO | WO 2009110140 A1 | 9/2009 |

OTHER PUBLICATIONS

U.S. Appl. No. 15/929,101, filed Feb. 5, 2019, Vinod Sasidharan.

(Continued)

*Primary Examiner* — Fahmida Rahman
(74) *Attorney, Agent, or Firm* — Patent Law Works LLP

(57) ABSTRACT

A direct-attached storage device bridge includes boot loader logic, a read-only memory, and logic to generate hash codes to be compared to determine whether to proceed with booting of the device. The hash codes may result from applying a public key from the read-only memory to decrypt an encrypted hash code into a decrypted hash code, to decrypt encrypted firmware instructions and to calculate a first calculated hash code of the decrypted firmware instructions, and to calculate a second calculated hash code for firmware instructions stored as clear-text. Multiple public keys may be utilized and selected during the boot process. The encryption and decryption may utilize asymmetric and symmetric keys.

19 Claims, 13 Drawing Sheets

(56) References Cited

U.S. PATENT DOCUMENTS

| | | |
|---|---|---|
| 9,900,325 B2 | 2/2018 | Semenko et al. |
| 10,958,435 B2* | 3/2021 | Spanier ................ H04L 9/3236 |
| 2004/0076043 A1 | 4/2004 | Boals et al. |
| 2006/0143600 A1 | 6/2006 | Cottrell et al. |
| 2009/0172420 A1* | 7/2009 | Zayas .................. G06F 21/575 |
| | | 713/194 |
| 2009/0241103 A1 | 9/2009 | Pennisi et al. |
| 2009/0327741 A1 | 12/2009 | Zimmer et al. |
| 2011/0087872 A1 | 4/2011 | Shah et al. |
| 2012/0110343 A1 | 5/2012 | Bandic et al. |
| 2014/0164725 A1 | 6/2014 | Jang et al. |
| 2017/0097830 A1 | 4/2017 | Ehrenberg et al. |
| 2017/0222807 A1* | 8/2017 | Tang .................... H04L 9/3093 |
| 2018/0097639 A1* | 4/2018 | Gulati ....................... G06F 8/61 |
| 2018/0188986 A1 | 7/2018 | Webster |
| 2020/0228346 A1* | 7/2020 | Sakata ................. H04L 9/3247 |

OTHER PUBLICATIONS

U.S. Appl. No. 16/365,346, filed Mar. 26, 2019, Tino Lin.
Ralp C. Merkle, Protocols for Public Key Cryptosystems, ELXSI International, Symposium on Security and Privacy, © 1980 IEEE, available at http://www.merkle.com/papers/Protocols.pdf, accessed on Sep. 19, 2019.
STMicroelectronics NV, Overview secure firmware install (SFI), Application Note, AN4992, available at https://www.st.com/content/ccc/resource/technical/document/application_note/group1/fb/aa/74/3f/a8/a9/49/a8/DM00355688/files/DM00355688.pdf/jcr:content/translations/en.DM00355688.pdf, accessed on Oct. 30, 2019. p. 6.
"How to Set a Firmware Password on Your Mac", Aug. 28, 2018.
"Security Challenges in Embedded Designs", Rippel.

* cited by examiner

FIG. 3

| HASH_A | HASH_B | HASH_C | GOOD BOOT? | REPAIR? |
|---|---|---|---|---|
| =B, =C | =A, =C | =A, =B | ✓ | ✗ |
| ☐B, ☐C | ☐A, =C | ☐A, =B | ✓ | ✗ |
| ☐B, =C | ☐A, ☐C | =A, ☐B | ✓ | ✗ |
| =B, ☐C | =A, ☐C | ☐A, ☐B | ✓ | ✓ |
| ☐B, ☐C | ☐A, ☐C | ☐A, ☐B | ✗ | ✗ |

302, 304, 306, 308, 310

SECURE FIRMWARE BOOTING

BACKGROUND

Devices such as direct-attached storage device bridges, hard disk drives, and solid state drives are vulnerable to malicious firmware logic tampering. A direct-attached storage device bridge is a digital storage system attached to a server or workstation without an intervening storage network. A direct-attached storage device may comprise a data storage device (for example enclosures holding a number of hard disk drives, solid state drives, or combination thereof) connected directly to a computer through a host bus adapter (HBA), without a network device (such as a hub, switch, or router) therebetween. Protocols used by direct-attached storage devices include Advanced Technology (AT) Attachment (ATA), Serial AT Attachment (SATA), External Serial AT Attachment (eSATA), Small Computer System Interface (SCSI), Serial Attached SCSI (SAS), Universal Serial Bus (USB), and Firewire (IEEE 1394).

Conventional techniques utilized to prevent firmware logic tampering include the use of digital signatures for firmware logic images, the use of encryption and decryption keys, and firmware validation processes executed during power-on-reset and firmware downloading. There is, however, a need for improvements over those conventional approaches to protecting firmware from logic tampering, and for recovering from situations involving tampered/corrupted firmware.

BRIEF SUMMARY

Disclosed herein are systems and methods for making direct-attached storage device bridge firmware more secure against logic tampering. The systems and methods may prevent attackers from creating and uploading their own firmware logic image using their own public key. The technique may also reduce design costs, such as the use of additional one-time-programmable fuses. The systems and methods may be utilized during design of the application-specific integrated circuit, in the direct-attached storage device bridge, during power-on-reset, and during firmware download.

This disclosure relates to a direct-attached storage device bridge that includes boot loader logic, a read-only memory, and logic to accomplish tasks associated with encryption and security. The logic may provide the ability to apply a public key from the read-only memory to decrypt an encrypted hash code into a decrypted hash code. The logic may apply the public key to decrypt encrypted firmware instructions and to calculate a first calculated hash code of the decrypted firmware instructions. The logic may calculate a second calculated hash code for firmware instructions stored as clear-text. The logic may apply the decrypted hash code, the first calculated hash code, and the second calculated hash code to a controlling the boot loader logic. In additional embodiments, the logic performing these tasks may reside in the host device or the direct-attached storage device connected to the direct-attached storage device bridge, to various degrees.

This disclosure further relates to a system that includes a direct-attached storage device and a direct-attached storage device bridge. The direct-attached storage device and direct-attached storage device bridge may be coupled to mediate access to the direct-attached storage device by a host device. The direct-attached storage device bridge may be configured to apply a public key to decrypt an encrypted hash code stored in a read-only memory into a decrypted hash code, apply the public key to decrypt encrypted firmware instructions and to calculate a first calculated hash code of the encrypted firmware instructions, calculate a second calculated hash code for firmware instructions stored as clear-text, and apply the decrypted hash code, the first calculated hash code, and the second calculated hash code to a device booting decision.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 illustrates a firmware boot decision table 300 in accordance with one embodiment.

DETAILED DESCRIPTION

Figure 1:
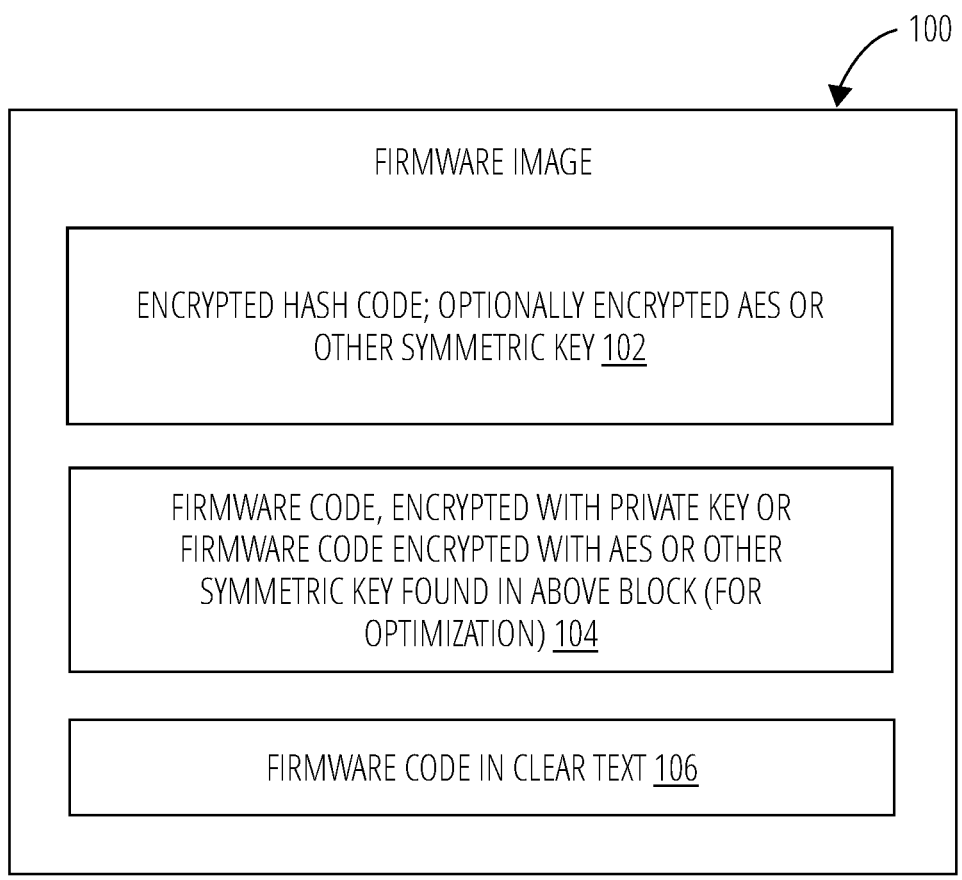
FIG. 1 illustrates a firmware logic image 100 in accordance with one embodiment.

Referring to FIG. 1, a firmware logic image 100 comprises an encrypted hash code 102, encrypted firmware instructions 104, and clear-text firmware instructions 106. The encrypted hash code 102 is a first data block of the firmware logic image 100. The encrypted hash code 102 may be generated from the firmware instructions (or code). A hashing technique may be performed on the firmware instructions. For example, Secure Hash Algorithm-256 (SHA-256) may be utilized. Other hashing techniques are known in the art, including cyclic redundancy checks, checksum functions, and cryptographic hash functions. In some embodiments, as explained below, the hash code may be combined with an optional Advanced encryption Standard (AES) key or other symmetric keys known in the art before being encrypted.

The encrypted firmware instructions 104 form a second data block of the firmware logic image 100. The encrypted firmware instructions 104 may be generated from the clear-text firmware instructions. An asymmetric private key or an optional AES key may be utilized to encrypt the firmware instructions. Utilizing the same key may increase the efficiency of a device utilizing the firmware logic image 100.

The clear-text firmware instructions 106 form a third data block of the firmware logic image 100. The clear-text firmware instructions 106 are the firmware instructions stored in clear-text.

The firmware logic image 100 may be implemented into a system 200 such as a direct-attached storage device bridge. The firmware logic image 100 may be generated utilizing the processes depicted in FIG. 5 and FIG. 11.

Figure 2:
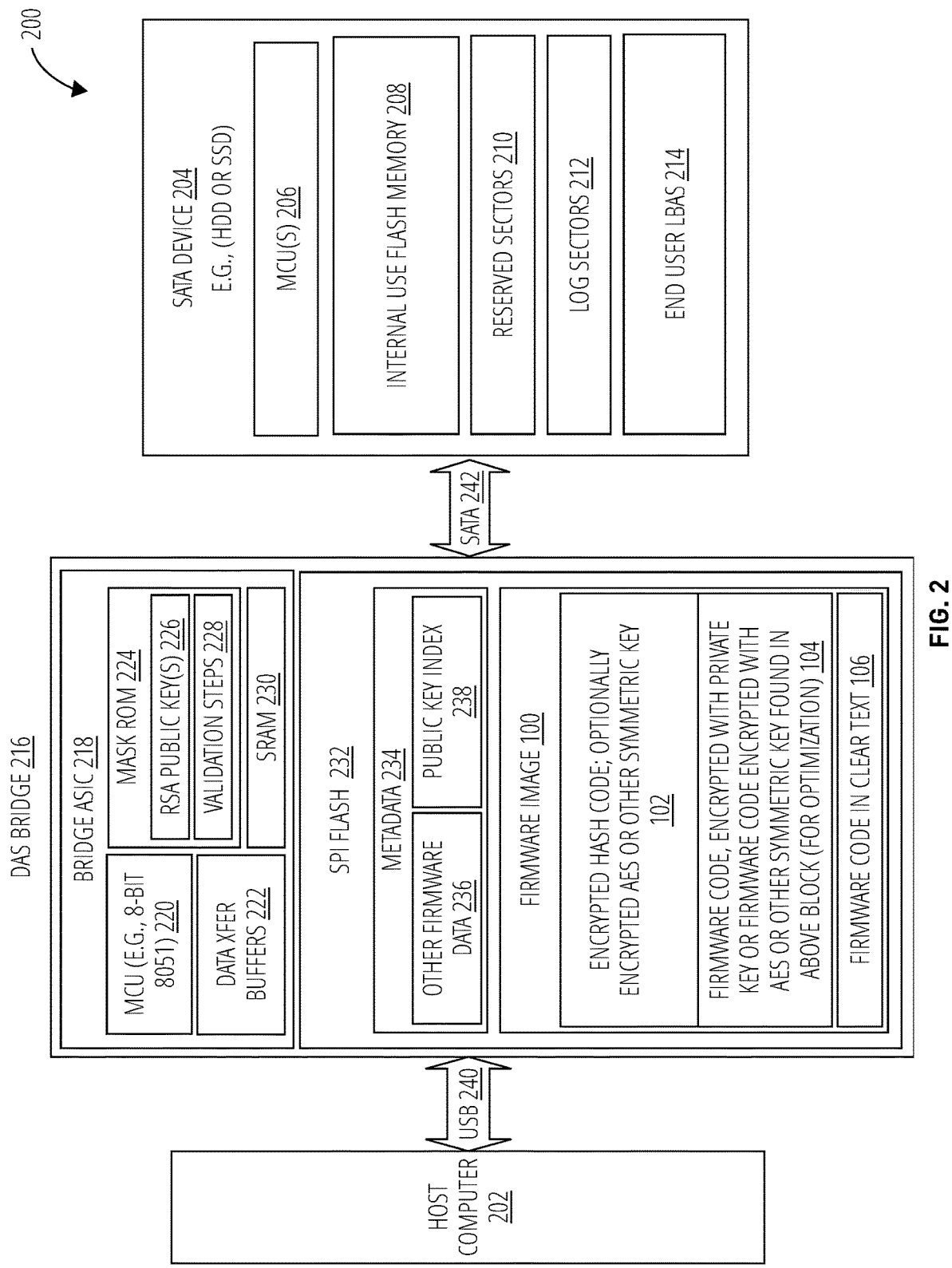
FIG. 2 illustrates a system 200 in accordance with one embodiment.

Referring to FIG. 2, a system 200 comprises a host computer 202, a serial ATA device 204, a direct-attached storage device bridge 216, a USB connection 240, and a serial ATA connection 242. The serial ATA device 204 includes a memory control unit 206, an internal use FLASH memory 208, reserved sectors 210, log sectors 212, and end user logical data block addresses 214. Logical data block addresses identify locations of data sectors on a storage device. The direct-attached storage device bridge 216 includes a bridge application-specific integrated circuit 218 and a serial peripheral interface FLASH 232. The bridge application-specific integrated circuit 218 further includes a memory control unit 220, data transfer buffers 222, a mask ROM 224, an RSA public key(s) 226, validation steps 228, and an SRAM 230. A mask ROM is a type of read-only memory (ROM) whose contents are programmed by the integrated circuit manufacturer (rather than by the end user). The serial peripheral interface FLASH 232 further includes metadata 234, such as other firmware data 236 and a public key index 238, and a firmware logic image 100 comprising an encrypted hash code 102, encrypted firmware instructions 104, and clear-text firmware instructions 106.

The host computer 202 provides to the direct-attached storage device bridge 216 data to be stored on the serial ATA device 204. The host computer 202 may also provide an update of firmware stored on the direct-attached storage device bridge 216. Furthermore, a power-on signal may be received by the direct-attached storage device bridge 216 from the host computer 202. Multiple host computers may be coupled to the direct-attached storage device bridge 216 utilizing multiple USB or other interfaces. The host computer 202 may in some environments be a server device to provide one or more private keys for encryption.

The serial ATA device 204 is a direct-attached storage device. The serial ATA device 204 may be a hard disk drive (HDD), a solid state drive (SSD), or other serial ATA devices. The memory control unit 206 directs the operation of the serial ATA device 204. The memory control unit 206 may operate the internal use FLASH memory 208, the reserved sectors 210, the log sectors 212, and the end user logical data block addresses 214, and other memory, arithmetic, and logic unit and input and output components in response to the instructions that have been received by the memory control unit 206. The internal use FLASH memory 208 is an electronic (solid-state) non-volatile computer storage medium that can be electrically erased and reprogrammed. The internal use FLASH memory 208 may store data received from the host computer 202 via the direct-attached storage device bridge 216. The reserved sectors 210 are extra physical blocks (or sectors) in reserve that are used to fill bad blocks in the logical address space. The log sectors 212 store a log of actions performed by the serial ATA device 204. The end user logical data block addresses 214 utilizes logical block addressing (LBA), or other schemes, to specify the location of blocks (or sectors) of data stored on the serial ATA device 204.

The direct-attached storage device bridge 216 may couple to the host computer 202 and the serial ATA device 204 via the USB connection 240 and the serial ATA connection 242, respectively. The direct-attached storage device bridge 216 may send and receive data from each of the host computer 202 and the serial ATA device 204. The direct-attached storage device bridge 216 may include boot loader logic. The boot loader logic may be stored in the mask ROM 224 of the bridge application-specific integrated circuit 218. The mask ROM 224 may comprise the RSA public key(s) 226, which are utilized to decrypt the firmware logic image 100. The firmware logic image 100 may be stored in the serial peripheral interface FLASH 232 of the direct-attached storage device bridge 216. The mask ROM 224 may also comprise the validation steps 228. This logic is utilized to determine the application of the RSA public key(s) 226 to the firmware logic image 100. The validation steps 228 may also determine the action taken by the direct-attached storage device bridge 216 during booting or during a firmware update. The validation steps 228 may be stored in other location not on the direct-attached storage device bridge 216, such as the host computer 202 or the serial ATA device 204. The direct-attached storage device bridge 216 may utilize the firmware logic image 100 as wells as the mask ROM 224 to securely boot or update firmware for the end-user or a blank FLASH memory device. The validation steps 228 may include logic to apply a public key from the read-only memory to decrypt an encrypted hash code into a decrypted hash code, logic to apply the public key to decrypt encrypted firmware instructions in the read-only memory and to calculate a first calculated hash code of the decrypted firmware instructions, logic to calculate a second calculated hash code for firmware instructions stored as clear-text in the read-only memory, and logic to apply the decrypted hash code, the first calculated hash code, and the second calculated hash code to a controlling the boot loader logic. The direct-attached storage device bridge 216 may determine actions taken per the firmware boot decision table 300 depicted in FIG. 3.

The bridge application-specific integrated circuit 218 also includes the memory control unit 220 to control the other components of the bridge application-specific integrated circuit 218. For example, the memory control unit 220 may be an 8-bit 8051 device. The data transfer buffers 222 may buffer data and commands received from the host computer 202, the serial ATA device 204, or other portions of the direct-attached storage device bridge 216 until the bridge application-specific integrated circuit 218 processes those data or commands. The mask ROM 224 is a type of read-only memory (ROM) whose contents are programmed by the integrated circuit manufacturer. The mask ROM 224 is not intended to be programmed by an end user (such as an attacker). The mask ROM 224 stores the RSA public key(s) 226 and, in some embodiments, the validation steps 228. The SRAM 230 is a type of semiconductor memory that uses bi-stable latching circuitry (flip-flop) to store each bit. The SRAM 230 may store calculated hash code (e.g., the HASH_A, HASH_B, HASH_C), as well as other calculated data to determine the hash code from the firmware logic image 100. The SRAM 230 may be less than or about 64 KB in some embodiments.

The serial peripheral interface FLASH 232 includes the metadata 234 and the firmware logic image 100. The serial peripheral interface FLASH 232 may be about 256 KB in some embodiments. The metadata 234 includes the other firmware data 236 and the public key index 238. The other firmware data 236 controls the device's specific hardware. The public key index 238 stores the associations between a private key (which may be stored on a server device) and the one of more RSA public key(s) 226. Tracking the RSA public key(s) 226 is important when generating the firmware logic image 100. The metadata 234 comprises the public key index 238 to direct the mask ROM 224 or the end-user's firmware to which of the RSA public key(s) 226 in read-only memory to use.

The system 200 may be operated in accordance with the process depicted in FIG. 6, FIG. 7, FIG. 8, FIG. 10, FIG. 12, and FIG. 13.

Referring to FIG. 3, a firmware boot decision table 300 comprises a hash code comparison 302, a hash code comparison 304, a hash code comparison 306, a hash code comparison 308, and a hash code comparison 310.

The firmware boot decision table 300 depicts the comparisons of the hash codes determined by the validation steps utilizing the firmware logic image and the public key. HASH_A is a decryption of the encrypted hash code. HASH_B is a hash code of the decryption of the encrypted firmware instructions. HASH_C is a hash code of the clear-text firmware instructions. The "GOOD boot?" column depicts whether the device is to be booted. The "REPAIR?" column depicts whether additional steps may be taken to repair the logic image.

For the hash code comparison 302, the HASH_A, the HASH_B, and the HASH_C all match. No corruption/tampering is determined, and device booting may be initiated. Additionally, no repair actions are taken.

For the hash code comparison 304, the HASH_A matches neither the HASH_B nor the HASH_C, but the HASH_B and the HASH_C match. Here, the hash code of the encrypted hash code data block is likely corrupted. Whether device booting occurs may depend on the type of public key utilized, an RSA public key or an AES key. For an RSA key, the firmware is authentic, but the hash data block is corrupted. The hash data block (HASH_A) may not be repaired as the private key may be unavailable. If an AES key is being utilized, the firmware may boot; however, a warning may be utilized. The warning may be a display on a user interface, a sound notification, etc. In addition, device booting may be based on a further user input to override the warning. The warning may be utilized as there is possibility that an attacker may obtain the public key in the read-only memory and utilize the public key to determine the AES key. With the AES key, an attacker may create their own firmware blocks, corresponding to HASH_B and HASH_C. In a further embodiment, the device booting may be ignored to be additionally secure.

For the hash code comparison 306, the HASH_A matches the HASH_C, but the HASH_B matches neither the HASH_A nor the HASH_C. Here, the firmware is still authentic, but the encrypted firmware instructions are corrupted. If an optimization technique with AES keys are being utilized, the AES key may be incorrect or corrupted instead of, or in addition to, the block content itself being corrupted.

For the hash code comparison 308, the HASH_A matches the HASH_B, but the HASH_C matches neither the HASH_A nor the HASH_B. Here, the firmware is still authentic and device booting may occur; however, the clear text firmware has corruption. The clear-text firmware instructions may be subsequently repaired by using the decrypted encrypted firmware instructions used to generate the HASH_B.

For the hash code comparison 310, none of the hash codes match each other. Here, the firmware is corrupted or tampered. No end user's firmware is booted; the device is stuck in ROM code. In some embodiments, the device may have multiple public keys stored in mask ROM. The hash code comparison 310 may initiate the utilization of another one of the public keys. For example, a firmware update may be initiated to update the public key to be utilized.

Figure 4:
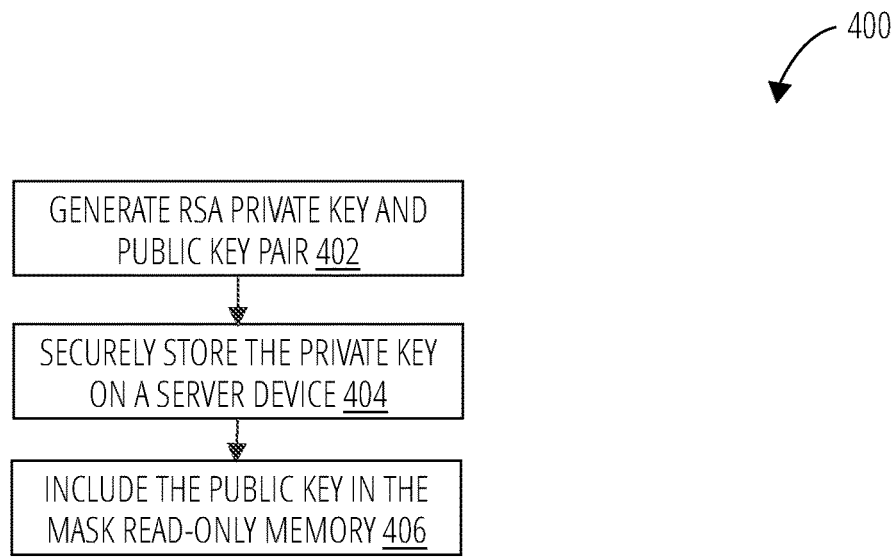
FIG. 4 illustrates an application-specific integrated circuit design process 400 in accordance with one embodiment.

Referring to FIG. 4, an application-specific integrated circuit design process 400 generates an RSA private key and public key pair (block 402). The RSA keys are asymmetric keys. Other asymmetric algorithms may be utilized. The private key is securely stored on a server device (block 404). The public key is included in the mask read-only memory of a direct-attached storage device bridge (block 406). The public key is hard-coded and may not be changed. Conventional designs that store the public key in FLASH memory are prone to successful logic tampering after the wrapping and unwrapping of the public key is broken, i.e., the AES key or one-time-programmable key is known. Thus, the public key is stored in the mask ROM to avoid these issues. The public key may be incorporated into the mask ROM during application-specific integrated circuit design.

Figure 5:
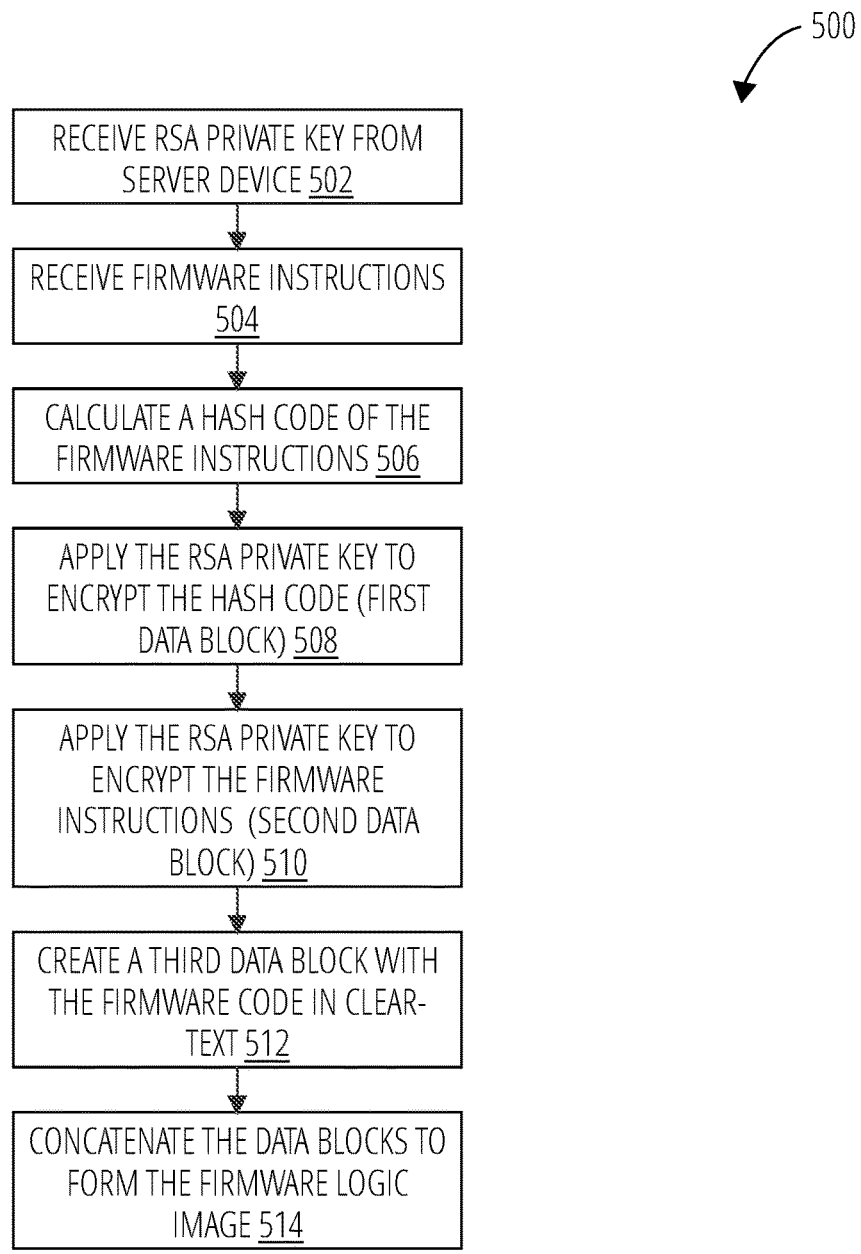
FIG. 5 illustrates a firmware logic image creation process 500 in accordance with one embodiment.

Referring to FIG. 5, a firmware logic image creation process 500 receives an RSA private key from server device (block 502). The firmware instructions are received (block 504). The firmware instructions may be stored on the direct-attached storage device bridge. A hash code of the firmware instructions is calculated (block 506). Various hashing techniques may be utilized, Such as SHA-256. The RSA private key is applied to encrypt the hash code (block 508). The encrypted hash code is the first data block. The RSA private key is applied to encrypt the firmware instructions (block 510). The encrypted firmware instructions is the second data block. A third data block is created with the firmware instructions (or code) in clear-text (block 512). The three data blocks are concatenate to form the firmware logic image (block 514).

Figure 6:
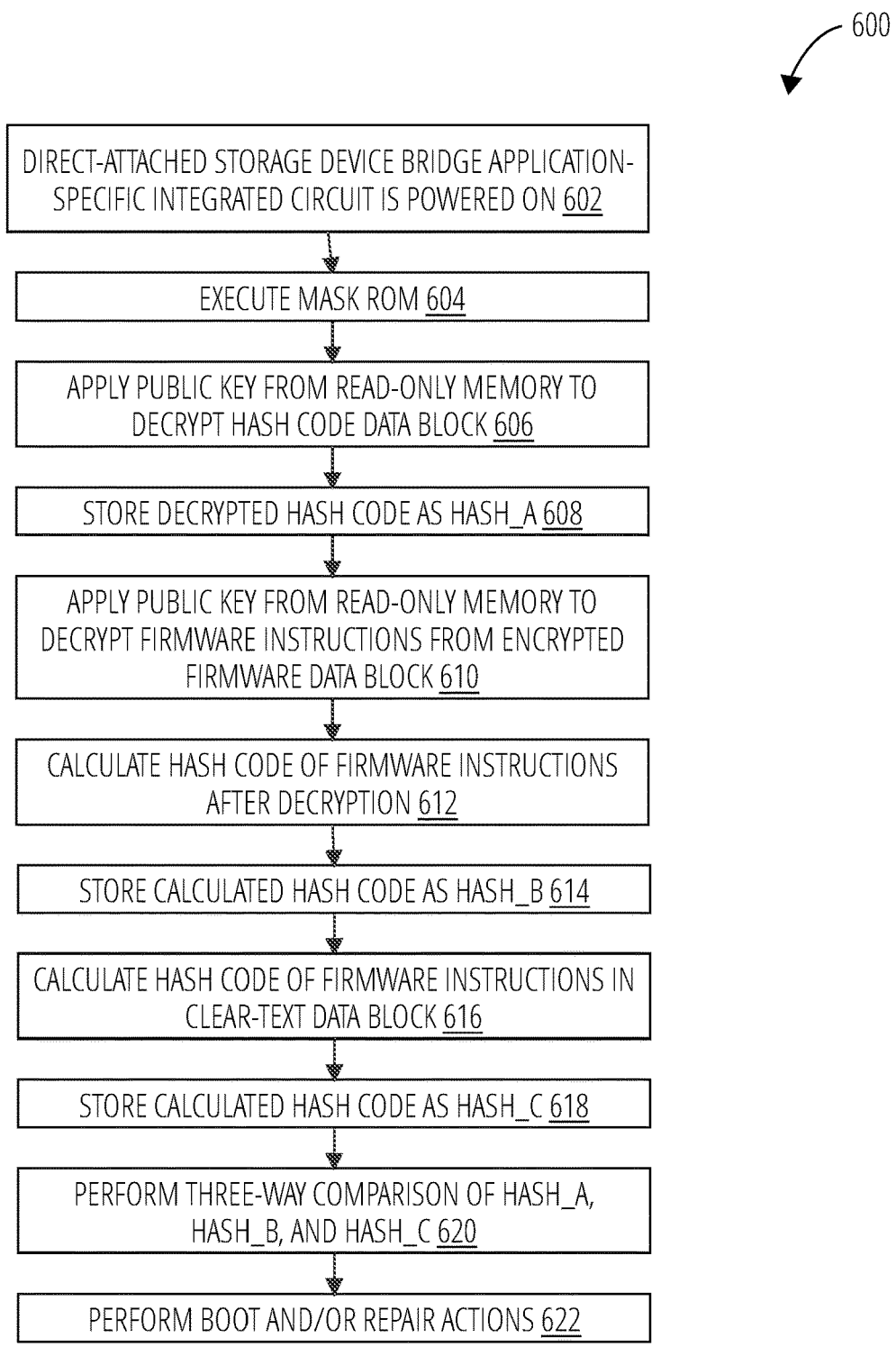
FIG. 6 illustrates a device booting process 600 in accordance with one embodiment.

Referring to FIG. 6, a device booting process 600 comprises a direct-attached storage device bridge application-specific integrated circuit being powered on (block 602). The mask ROM is executed (block 604). The mask ROM may be located in the application-specific integrated circuit of the direct-attached storage device bridge. A public key from read-only memory is applied to decrypt a hash code data block (block 606). The hash code data block may be stored in the serial peripheral interface FLASH as part of a logic image. The decrypted hash code is stored as HASH_A (block 608). The HASH_A may be stored in SRAM. The public key from read-only memory is applied to decrypt firmware instructions from encrypted firmware data block (block 610). The encrypted firmware data block may be stored in the serial peripheral interface FLASH as part of a logic image. A hash code of the firmware instructions is calculated after decryption (block 612). Various hashing techniques may be utilized, such as SHA-256. The same hashing technique utilized to generate the hash code data block may be utilized. The calculated hash code is stored as HASH_B (block 614). The HASH_B may be stored in SRAM. A hash code is calculated of the firmware instructions in clear-text data block (block 616). Various hashing techniques may be utilized, such as SHA-256. The same hashing technique utilized to generate the hash code data block may be utilized. The calculated hash code is stored as HASH_C (block 618). The HASH_C may be stored in SRAM. A three-way comparison of HASH_A, HASH_B, and HASH_C is performed (block 620). The three-ways comparison facilitates detection of which data block is the corrupted data block. A two-way comparison merely indicates that the two data blocks are not equal, but not which one is the corrupted data block. Boot and/or repair actions are performed (block 622). The actions taken may be those depicted in FIG. 3 based on the results of the comparison of the hash codes. The action may be determined by the mask ROM. All or part of the above steps may be performed on the direct-attached storage device bridge. Some steps may be performed on a host device or a direct-attached storage device.

The device booting process 600 includes many advantages over conventional techniques. First, the firmware logic image is uploaded one time, but has double copy capability (dual firmware copy protection). Second, logic tampering detection may be performed. The device booting process 600 does not require extra cyclic redundancy check or checksum to detect corruption or logic tampering during firmware device booting. Additionally, a firmware repairing mechanism may be utilized. Finally, it may be very difficult for an attacker to download their own public key.

Figure 7:
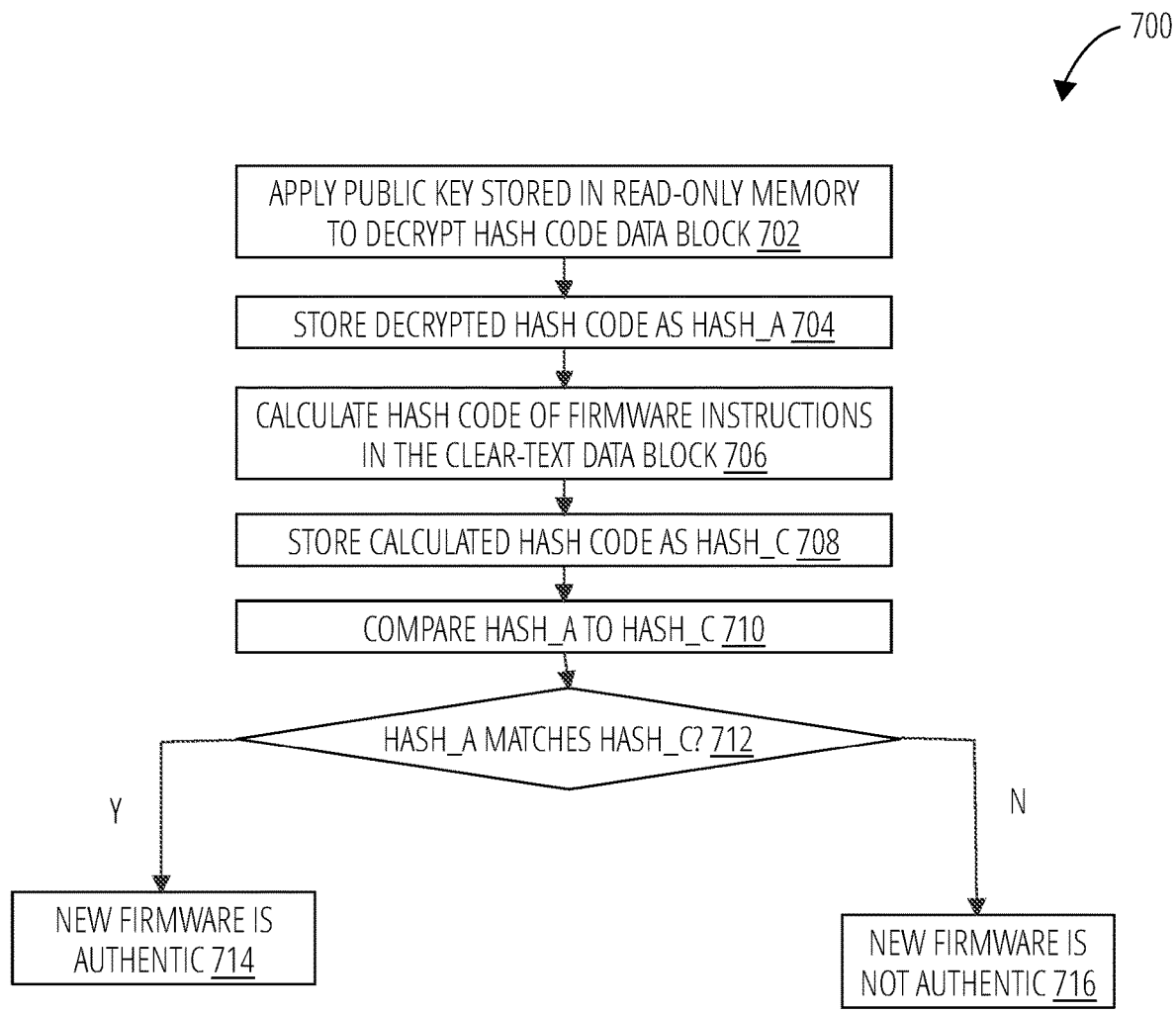
FIG. 7 illustrates an end-user firmware update process 700 in accordance with one embodiment.

Referring to FIG. 7, an end-user firmware update process 700 applies a public key stored in read-only memory to decrypt a hash code data block (block 702). The decrypted hash code is stored as HASH_A (block 704). A hash code of firmware instructions in the clear-text data block is calculated (block 706). The calculated hash code is stored as HASH_C (block 708). The HASH_A is compared to the HASH_C (block 710). The end-user firmware update process 700 determines whether the HASH_A matches the HASH_C (decision block 712). If so, the new firmware is authentic (block 714). The firmware update may then be initiated. If HASH_A does not match HASH_C, the new firmware is not authentic (block 716). The firmware update may then be cancelled. The firmware update may be performed on the end-user firmware.

In some embodiments, to check the data integrity of the transmission, a cyclic redundancy check may be added to the firmware logic image, instead of requiring decryption of the encrypted firmware instructions data block and comparing all three data blocks, which involves a longer processing time.

Figure 8:
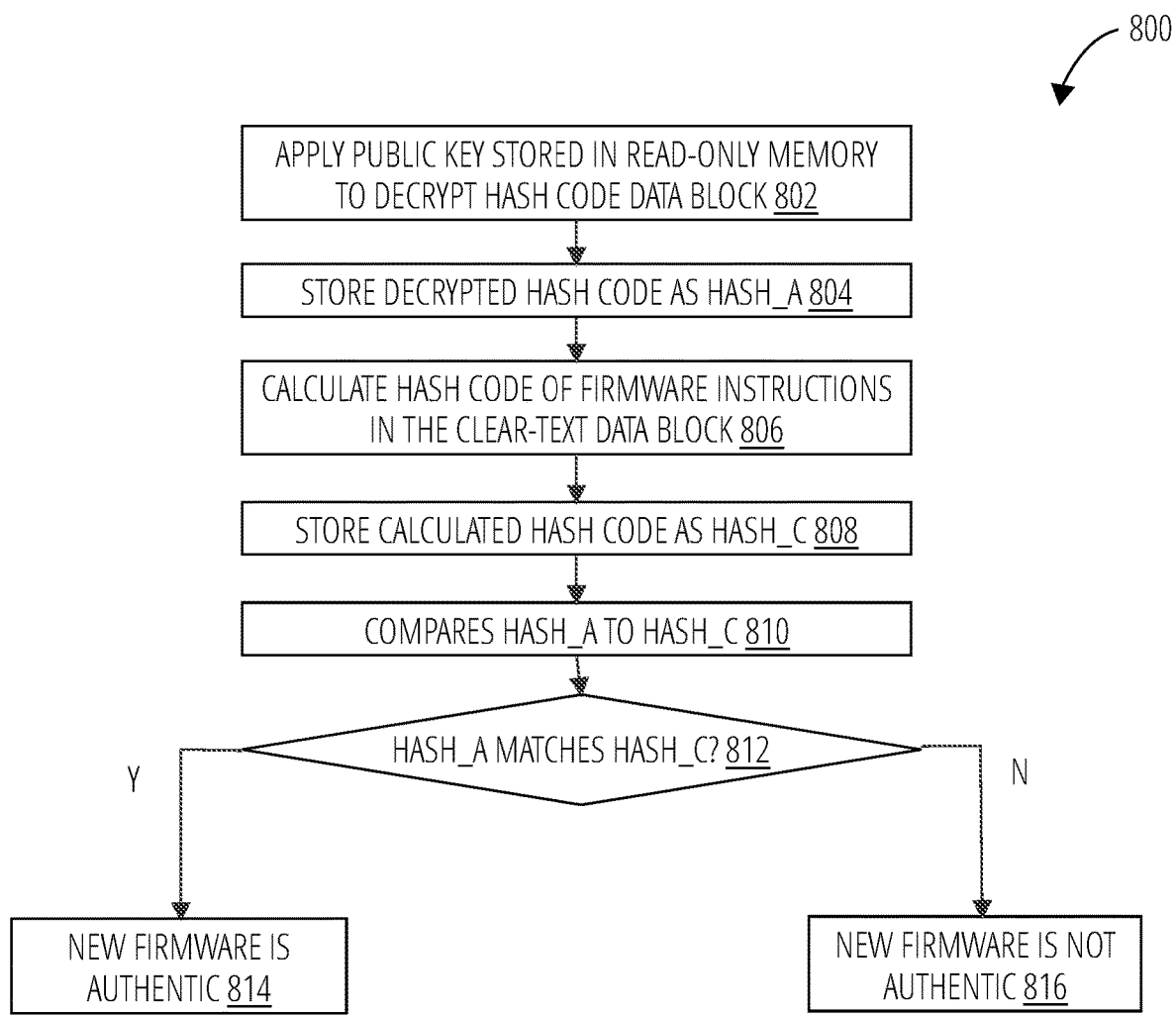
FIG. 8 illustrates a blank FLASH memory device firmware update process 800 in accordance with one embodiment.

Referring to FIG. 8, a blank FLASH memory device firmware update process 800 applies a public key stored in read-only memory to decrypt a hash code data block (block 802). The decrypted hash code is stored as HASH_A (block 804). A hash code of firmware instructions in the clear-text data block is calculated (block 806). The calculated hash code is stored as HASH_C (block 808). The HASH_A is compared to the HASH_C (block 810). The blank FLASH memory device firmware update process 800 determines whether the HASH_A matches the HASH_C (decision block 812). If so, the new firmware is authentic (block 814). The firmware update may then be initiated. If HASH_A does not match HASH_C, the new firmware is not authentic (block 816). The firmware update may then be cancelled. Either the mask ROM or other boot loader logic (2nd stage) may perform these firmware validation steps.

In some embodiments, to check the data integrity of the transmission, a cyclic redundancy check may be added to the firmware logic image, instead of requiring decryption of the encrypted firmware instructions data block and comparing all three data blocks, which involves a longer processing time.

Figure 9:
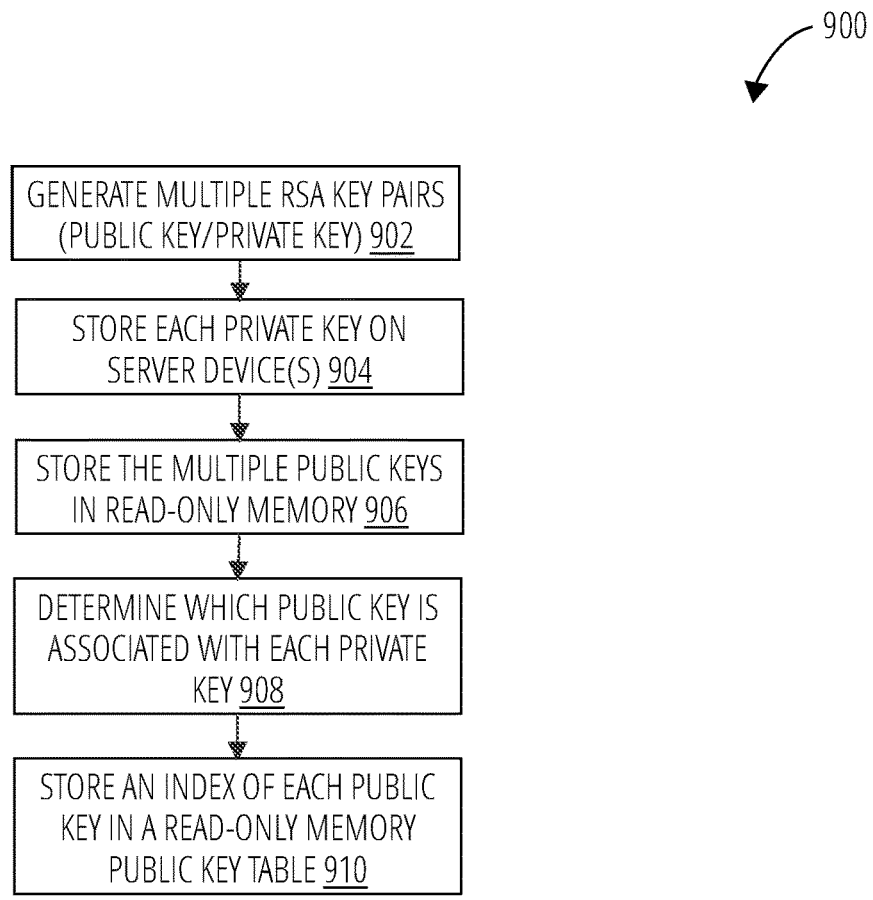
FIG. 9 illustrates an application-specific integrated circuit design process with multiple public keys in read-only memory 900 in accordance with one embodiment.

Referring to FIG. 9, an application-specific integrated circuit design process with multiple public keys in read-only memory 900 generates multiple RSA key pairs (block 902). The key pairs are public key/private key pairs. Each private key is stored on a server device(s) (block 904). The private keys may each be stored on a different server device to enhance security. In other embodiments, a portion or all of the private keys are stored on one server device. The multiple public keys are stored in read-only memory (block 906). The public keys may be stored in the mask ROM of a direct-attached storage device bridge. Determine which public key is associated with each private key (block 908). Tracking the public keys is important when generating the firmware logic image. An index of each public key is stored in a read-only memory public key table (block 910). The index may be stored in the metadata of the serial peripheral interface FLASH. The metadata data block of the firmware logic image comprises the index directing the mask ROM/end-user's firmware to which public key in read-only memory to use.

Figure 10:
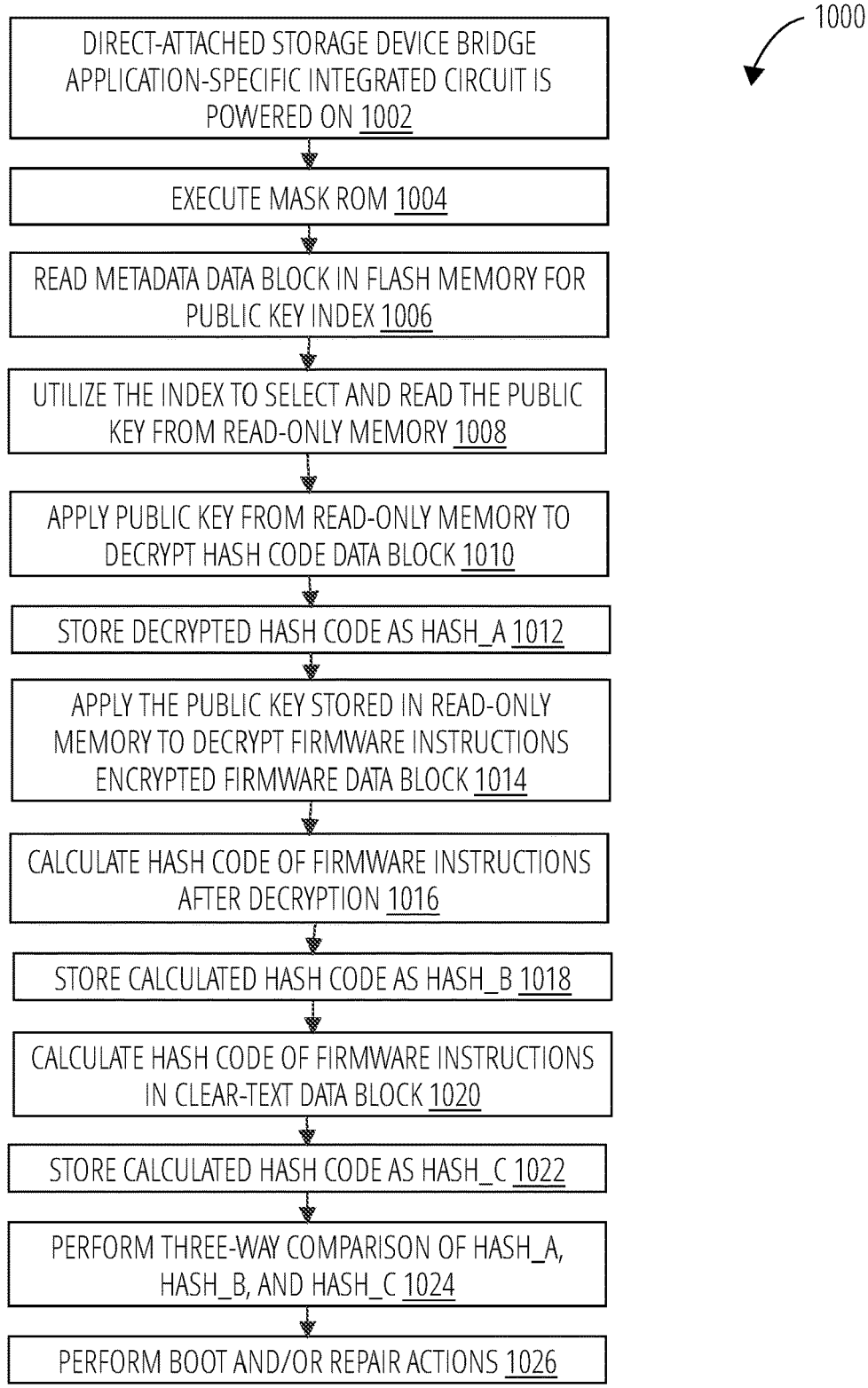
FIG. 10 illustrates a device booting process with multiple public keys in read-only memory 1000 in accordance with one embodiment.

Referring to FIG. 10, a device booting process with multiple public keys in read-only memory 1000 comprises a direct-attached storage device bridge application-specific integrated circuit being powered on (block 1002). The mask ROM is executed (block 1004). The metadata data block in FLASH memory is read for public key index (block 1006). The mask ROM instructions may perform this step. This may help prevent an attacker from downloading their firmware using a compromised private key. The index is utilized to select and read the public key from read-only memory (block 1008). Multiple public keys may be stored in the read-only memory (such as a mask ROM). The index determine the public key is the read-only memory to utilize. The mask ROM may be located in the application-specific integrated circuit of the direct-attached storage device bridge. The selected public key from read-only memory is applied to decrypt a hash code data block (block 1010). The hash code data block may be stored in the serial peripheral interface FLASH as part of a logic image. The decrypted hash code is stored as HASH_A (block 1012). The HASH_A may be stored in SRAM. The public key from read-only memory is applied to decrypt firmware instructions from encrypted firmware data block (block 1014). The encrypted firmware data block may be stored in the serial peripheral interface FLASH as part of a logic image. A hash code of the firmware instructions is calculated after decryption (block 1016). Various hashing techniques may be utilized, Such as SHA-256. The same hashing technique utilized to generate the hash code data block may be utilized. The calculated hash code is stored as HASH_B (block 1018). The HASH_B may be stored in SRAM. A hash code is calculated of the firmware instructions in clear-text data block (block 1020). Various hashing techniques may be utilized, Such as SHA-256. The same hashing technique utilized to generate the hash code data block may be utilized. The calculated hash code is stored as HASH_C (block 1022). The HASH_C may be stored in SRAM. A three-way comparison of HASH_A, HASH_B, and HASH_C is performed (block 1024). The three-ways comparison facilitates detection of which data block is the corrupted data block. A two-way comparison merely indicates that the two data blocks are not equal, but not which one is the corrupted data block. Boot and/or repair actions are performed (block 1026). The actions taken may be those depicted in FIG. 3 based on the results of the comparison of the hash codes. The action may be determined by the mask ROM. All or part of the above steps may be performed on the direct-attached storage device bridge.

Some steps may be performed on a host device or a direct-attached storage device.

Utilizing multiple public keys has benefits above conventional techniques. First, when the corresponding private key for the current public key being applied is compromised, a firmware update may be made that applies a different public key from the read-only memory, instead of redesigning and deploying the application-specific integrated circuit. An attacker may then no longer utilize the compromised private key to inject malicious firmware as the read-only memory instructions are directed to apply a different public key from the firmware update. Additionally, different products lines (i.e., different device categories or versions) may apply different public keys from one another. A specific product line that was successfully attacked does not compromise other products using the same application-specific integrated circuit.

Figure 11:
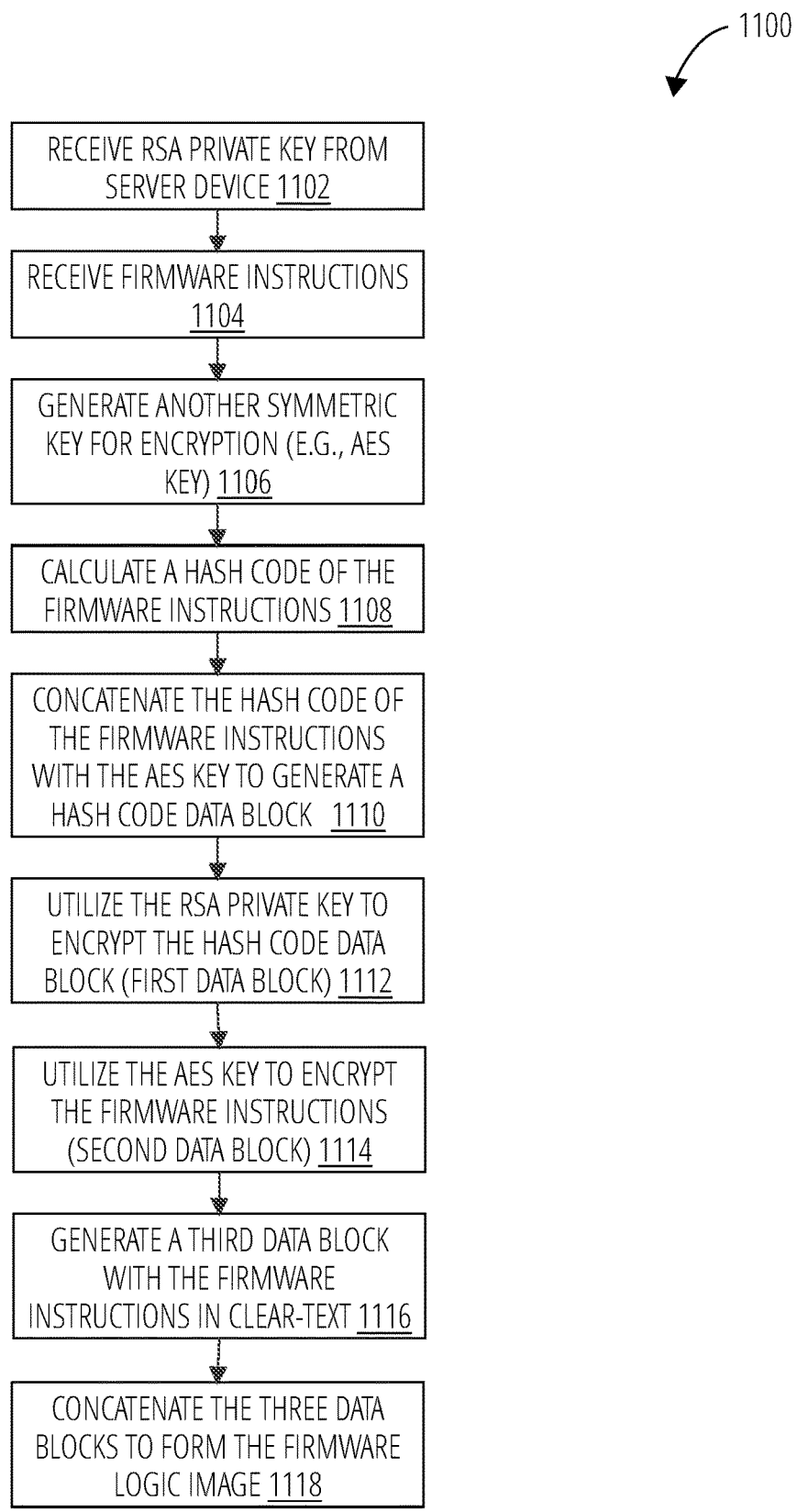
FIG. 11 illustrates a firmware logic image creation process using extra AES key 1100 in accordance with one embodiment.

Referring to FIG. 11, a firmware logic image creation process using extra AES key 1100 receives an RSA private key from server device (block 1102). The firmware instructions are received (block 1104). Another key for AES encryption (AES key) is generated (block 1106). A hash code of the firmware instructions is calculated (block 1108). The hash code of the firmware instructions is concatenated with the AES key to generate a hash code data block (block 1110). The RSA private key is utilized to encrypt the hash code data block (block 1112). This is the first data block. The AES key is utilized to encrypt the firmware instructions (block 1114). This is the second data block. A third data block is generated with the firmware instructions in clear-text (block 1116). The three data blocks are concatenated to form the firmware logic image (block 1118). Utilizing a symmetric key, such as AES, to decrypt larger firmware instructions may be faster, which reduces the firmware booting time for power-on-reset. Additionally, even if an attacker obtains the AES key and inserts their own firmware hash code for HASH_B and HASH_C, the three-way comparison may prevent their firmware from being used during device booting.

Figure 12:
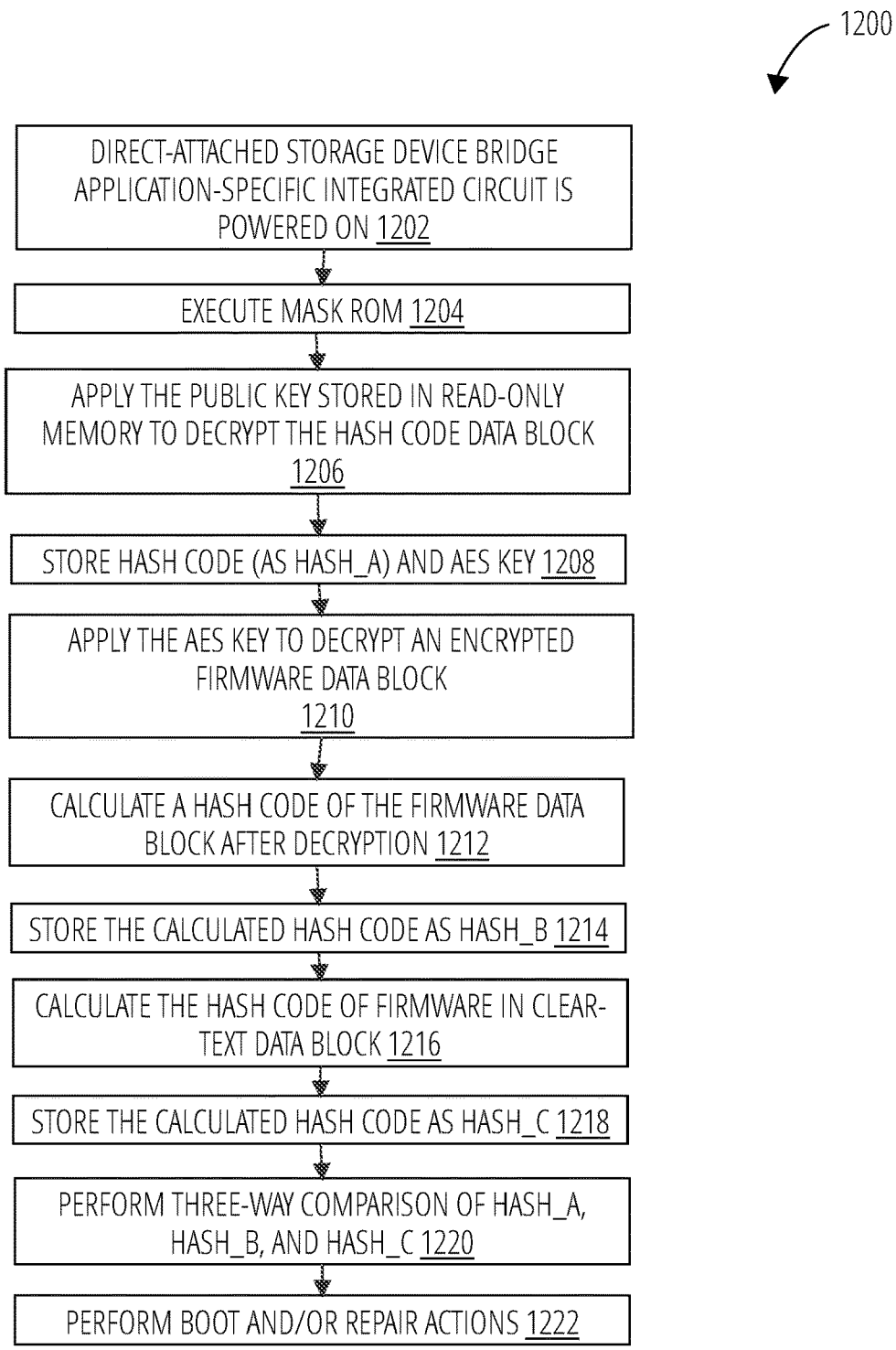
FIG. 12 illustrates a device booting process using extra AES key 1200 in accordance with one embodiment.

Referring to FIG. 12, a device booting process using extra AES key 1200 comprises a direct-attached storage device bridge application-specific integrated circuit being powered on (block 1202). A mask ROM is executed (block 1204). A public key stored in read-only memory is applied to decrypt the hash code data block (block 1206). The hash code is stored as HASH_A and an AES key (block 1208). The AES key is applied to decrypt an encrypted firmware data block (block 1210). A hash code of the firmware data block is calculated after decryption (block 1212). The calculated hash code is stored as HASH_B (block 1214). The hash code of firmware instructions in clear-text data block is calculated (block 1216). The calculated hash code is stored as HASH_C (block 1218). A three-way comparison of HASH_A, HASH_B, and HASH_C is performed (block 1220). Boot and/or repair actions are performed (block 1222). The actions taken may be those depicted in FIG. 3 based on the results of the comparison of the hash codes. The action may be determined by the mask ROM. All or part of the above steps may be performed on the direct-attached storage device bridge. Some steps may be performed on a host device or a direct-attached storage device.

Figure 13:
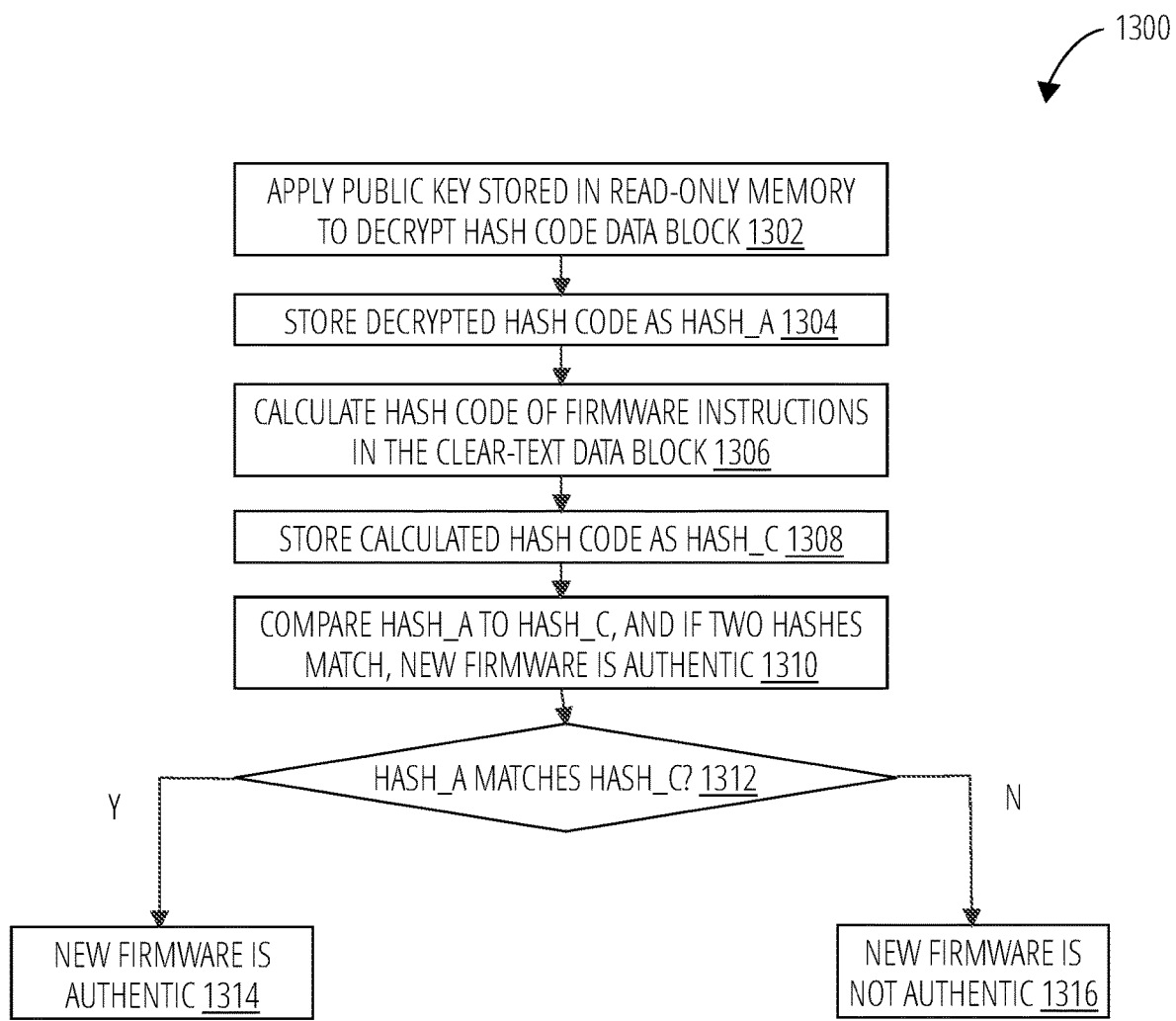
FIG. 13 illustrates an end-user firmware update process using extra AES key 1300 in accordance with one embodiment.

Referring to FIG. 13, an end-user firmware update process using extra AES key 1300 applies a public key stored in read-only memory to decrypt a hash code data block (block 1302). The decrypted hash code is stored as HASH_A (block 1304). A hash code of firmware instructions in the clear-text data block is calculated (block 1306). The calculated hash code is stored as HASH_C (block 1308). The HASH_A is compared to the HASH_C (block 1310). The end-user firmware update process using extra AES key 1300 determines whether the HASH_A matches the HASH_C (decision block 1312). If so, the new firmware is authentic (block 1314). The firmware update may then be initiated. If HASH_A does not match HASH_C, the new firmware is not authentic (block 1316). The firmware update may then be cancelled. The firmware update may be performed on the end-user firmware. The end-user firmware update process using extra AES key 1300 is similar to the end-user firmware update process 700 as decrypting the encrypted firmware instructions (which was here encrypted with the AES key instead of the RSA key) is not performed to authenticate the firmware download.

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

"Logic" is used herein to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C. § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A direct-attached storage device bridge comprising:
    a memory configured to store a firmware image to boot a device;
    a read-only memory configured to store a public key; and
    logic to, responsive to powering on the direct-attached storage device bridge:
        access the firmware image in the memory, wherein the firmware image comprises:
            an encrypted hash code;
            encrypted firmware instructions; and
            firmware instructions stored as clear-text;
        use the public key to decrypt the encrypted hash code into a decrypted hash code;
        use the public key to decrypt the encrypted firmware instructions into decrypted firmware instructions;
        calculate a first calculated hash code of the decrypted firmware instructions;
        calculate a second calculated hash code for the firmware instructions stored as clear-text;
        compare the decrypted hash code, the first calculated hash code, and the second calculated hash code;
        determine, based on the comparison of the decrypted hash code, the first calculated hash code, and the second calculated hash code, a firmware boot decision; and
        boot, based on the firmware boot decision, the device using the clear-text firmware instructions.

2. The direct-attached storage device bridge of claim 1, further comprising:
    a FLASH memory separate from the read-only memory, the FLASH memory configured to store an index; and
    logic to apply the index to identify the public key from a plurality of public keys stored in the read-only memory.

3. The direct-attached storage device bridge of claim 1, wherein the firmware boot decision includes booting the device with no warnings on condition of any one of the following:
    the decrypted hash code, the first calculated hash code, and the second calculated hash code are all equal to one another;
    the decrypted hash code and the second calculated hash code are equal to one another, the decrypted hash code is not equal to the first calculated hash code, and the second calculated hash code is not equal to the first calculated hash code; and
    the decrypted hash code and the first calculated hash code are equal to one another, the decrypted hash code is not equal to the second calculated hash code, and the second calculated hash code is not equal to the first calculated hash code.

4. The direct-attached storage device bridge of claim 1, wherein the firmware boot decision includes booting the device with a warning on condition that:
    the second calculated hash code is equal to the first calculated hash code; and
    the decrypted hash code is not equal to the first calculated hash code or equal to the second calculated hash code.

5. The direct-attached storage device bridge of claim 4, wherein the warning is a warning that the encrypted firmware instructions are compromised.

6. The direct-attached storage device bridge of claim 1, wherein the firmware boot decision comprises performing a firmware repair on condition that:
    the decrypted hash code and the first calculated hash code are equal to one another;
    the decrypted hash code is not equal to the second calculated hash code; and
    the second calculated hash code is not equal to the first calculated hash code.

7. The direct-attached storage device bridge of claim 1, wherein the firmware boot decision comprises inhibiting booting the device on condition that:
    the decrypted hash code, the first calculated hash code, and the second calculated hash code are all different from one another.

8. A system comprising:
    means for storing a firmware image, wherein the firmware image comprises:
        an encrypted hash block;
        encrypted firmware instructions; and
        firmware instructions stored as clear-text;
    means for booting a device using the firmware image;
    read-only memory configured to store a public key; and
    means for validating the firmware image, wherein the means for validating is configured to, responsive to powering on and prior to booting the device:
        use the public key to decrypt the encrypted hash block into a decrypted hash code and a symmetric key;
        use the symmetric key to decrypt the encrypted firmware instructions into decrypted firmware instructions;
        calculate a first calculated hash code of the decrypted firmware instructions;
        calculate a second calculated hash code for the firmware instructions stored as clear-text;

compare the decrypted hash code, the first calculated hash code, and the second calculated hash code;

determine, based on the comparison of the decrypted hash code, the first calculated hash code, and the second calculated hash code, a firmware boot decision; and initiate the means for booting the device based on the firmware boot decision.

9. The system of claim 8, further comprising:

additional memory means separate from the read-only memory, wherein:

the additional memory means is configured to store an index; and the means for validating the firmware image is configured to use the index to identify the public key from a plurality of public keys stored in the read-only memory.

10. The system of claim 8, wherein the means for validating the firmware image is configured to initiate the means for booting the device with no warnings on condition of any one of the following:

the decrypted hash code, the first calculated hash code, and the second calculated hash code are all equal to one another;

the decrypted hash code and the second calculated hash code are equal to one another, the decrypted hash code is not equal to the first calculated hash code, and the second calculated hash code is not equal to the first calculated hash code; and the decrypted hash code and the first calculated hash code are equal to one another, the decrypted hash code is not equal to the second calculated hash code, and the second calculated hash code is not equal to the first calculated hash code.

11. The system of claim 8, wherein the means for validating the firmware image is configured to initiate the means for booting the device with a warning on condition that:

the second calculated hash code is equal to the first calculated hash code; and the decrypted hash code is not equal to the first calculated hash code or equal to the second calculated hash code.

12. The system of claim 11, wherein the warning is a warning that the symmetric key may be compromised.

13. The system of claim 8, further comprising:

means for performing a firmware repair, wherein the means for validating the firmware image is configured to initiate the means for performing the firmware repair on condition that:

the decrypted hash code and the first calculated hash code are equal to one another;

the decrypted hash code is not equal to the second calculated hash code; and the second calculated hash code is not equal to the first calculated hash code.

14. The system of claim 8, wherein the means for validating the firmware image is configured to inhibit operation of the means for booting the device on condition that:

the decrypted hash code, the first calculated hash code, and the second calculated hash code are all different from one another.

15. A method for booting a device using a firmware image, the method comprising:

storing the firmware image in a storage device, the firmware image comprising:

an encrypted hash code;

encrypted firmware instructions; and firmware instructions stored as clear-text; and powering on the storage device and responsive to powering on the storage device, executing the following:

using a public key from a read-only memory to decrypt the encrypted hash code into a decrypted hash code;

using the public key to decrypt the encrypted firmware instructions into decrypted firmware instructions;

calculating a first calculated hash code of the decrypted firmware instructions;

calculating a second calculated hash code for the firmware instructions stored as clear-text;

comparing the decrypted hash code, the first calculated hash code, and the second calculated hash code;

determining, based on the comparison of the decrypted hash code, the first calculated hash code, and the second calculated hash code, a firmware boot decision; and booting, based on the firmware boot decision, the device using the clear-text firmware instructions.

16. The method of claim 15, further comprising:

applying an index stored in a FLASH memory separate from the read-only memory to identify the public key from a plurality of public keys stored in the read-only memory.

17. The method of claim 15, wherein the firmware boot decision includes booting the device with no warnings on condition of any one of the following:

the decrypted hash code, the first calculated hash code, and the second calculated hash code are all equal to one another;

the decrypted hash code and the second calculated hash code are equal to one another, the decrypted hash code is not equal to the first calculated hash code, and the second calculated hash code is not equal to the first calculated hash code; and the decrypted hash code and the first calculated hash code are equal to one another, the decrypted hash code is not equal to the second calculated hash code, and the second calculated hash code is not equal to the first calculated hash code.

18. The method of claim 15, wherein the firmware boot decision includes booting the device with a warning on condition that:

the second calculated hash code is equal to the first calculated hash code; and the decrypted hash code is not equal to the first calculated hash code or equal to the second calculated hash code.

19. The method of claim 15, further comprising performing a firmware repair on condition that:

the decrypted hash code and the first calculated hash code are equal to one another;

the decrypted hash code is not equal to the second calculated hash code; and the second calculated hash code is not equal to the first calculated hash code.

* * * * *